Nov. 9, 1954  G. W. ALLAN  2,693,909
ACCOUNTING METHOD AND ARTICLE
Filed Aug. 9, 1952  2 Sheets-Sheet 1
FIG. 1.
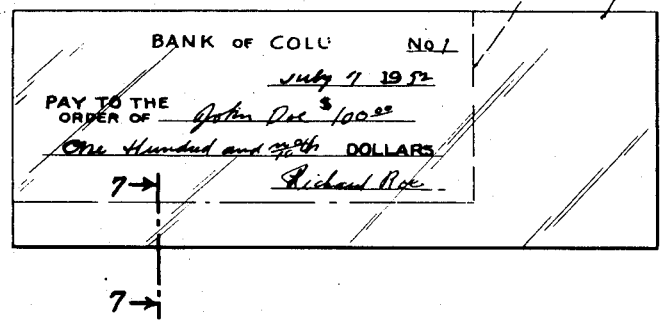
FIG. 2.
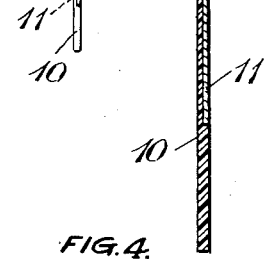
FIG. 7.
FIG. 3.
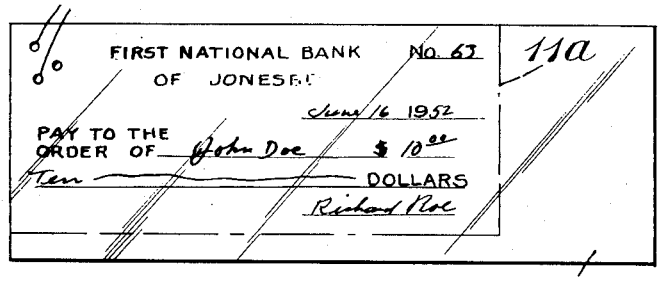
FIG. 4.
FIG. 5.
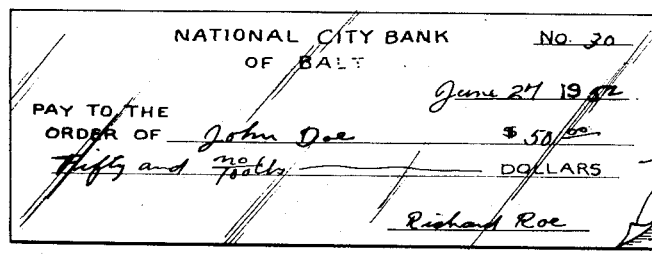
FIG. 6.
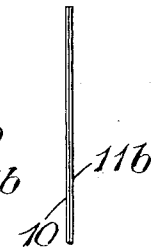
INVENTOR.
GEORGE W. ALLAN
BY Harper Allen
ATTORNEY Nov. 9, 1954  G. W. ALLAN  2,693,909
ACCOUNTING METHOD AND ARTICLE
Filed Aug. 9, 1952  2 Sheets—Sheet 2

INVENTOR
GEORGE W. ALLAN
BY
ATTORNEY.

United States Patent Office 2,693,909
Patented Nov. 9, 1954

2,693,909

ACCOUNTING METHOD AND ARTICLE

George W. Allan, San Lorenzo, Calif.

Application August 9, 1952, Serial No. 303,583

4 Claims. (Cl. 235—61.12)

The present invention relates to accounting systems and articles and is concerned more particularly with the provision of such systems and articles which will simplify and speed up the handling of accounting items in banks, clearing houses and other similar places of business where considerable numbers of accounting items must be handled daily.

The present work load in banks, clearing houses and other similar institutions handling large amounts of accounting items such as checks, deposit slips, cash letters, bond coupons and the like, is enormous and requires employment of large numbers of people and listing equipment for handling these items during the flow through the accounting system of the particular place of business. The problem is complicated because of the difference in physical size and characteristics of many of the accounting items. For example, most banks supply checks in a number of sizes, must handle cash letters and deposit slips of still a different size, bond coupons and other accounting items, which preclude the use of automatic equipment for performing the account operations. In accordance with the present invention, it is made possible to convert all checks, cash letters, bond coupons, deposit slips and other accounting items into coded cards of the same size and of a necessary rigidity for automatic mechanical handling. These articles are proved at the point of origin and then can be sorted, tabulated and listed according to the handling and accounting requirements of the particular institution. These coded cards can be handled in the sorting, tabulating and listing operations by known automatic equipment of the punch card type.

This system not only provides for the automatic handling of the various accounting items, as explained above and thereby eliminates a large amount of accounting help now required in most institutions due to the multiple sorting, listing and re-sorting and listing now required by manual visual methods. The system also largely eliminates the possibility of human error thereby eliminating a great deal of waste time in present accounting systems, where, because of errors, re-working of various accounting runs must be made to locate the source of error. The above and other objects of the invention will be apparent from the following description of a preferred embodiment thereof as illustrated in the accompanying drawings, in which:

Figure 1 is a plan view of a small check attached to a check carrier or code card in accordance with the instant invention.

Figure 2 is a transverse sectional view of Figure 1 taken as indicated by the line 2—2 in Figure 1, with the cross-section of the parts enlarged for clarity.

Figures 3 and 4 are views similar to Figures 1 and 2 but illustrating the carrier or code card associated with a different size of check.

Figures 5 and 6 are views similar to Figures 1 and 2 showing the code card or carrier attached to a check of maximum size so that it coincides with the size of the check itself.

Figure 7 is a fragmenetary sectional view through the check of Figure 1 taken as indicated by the line 7—7.

Figure 8:
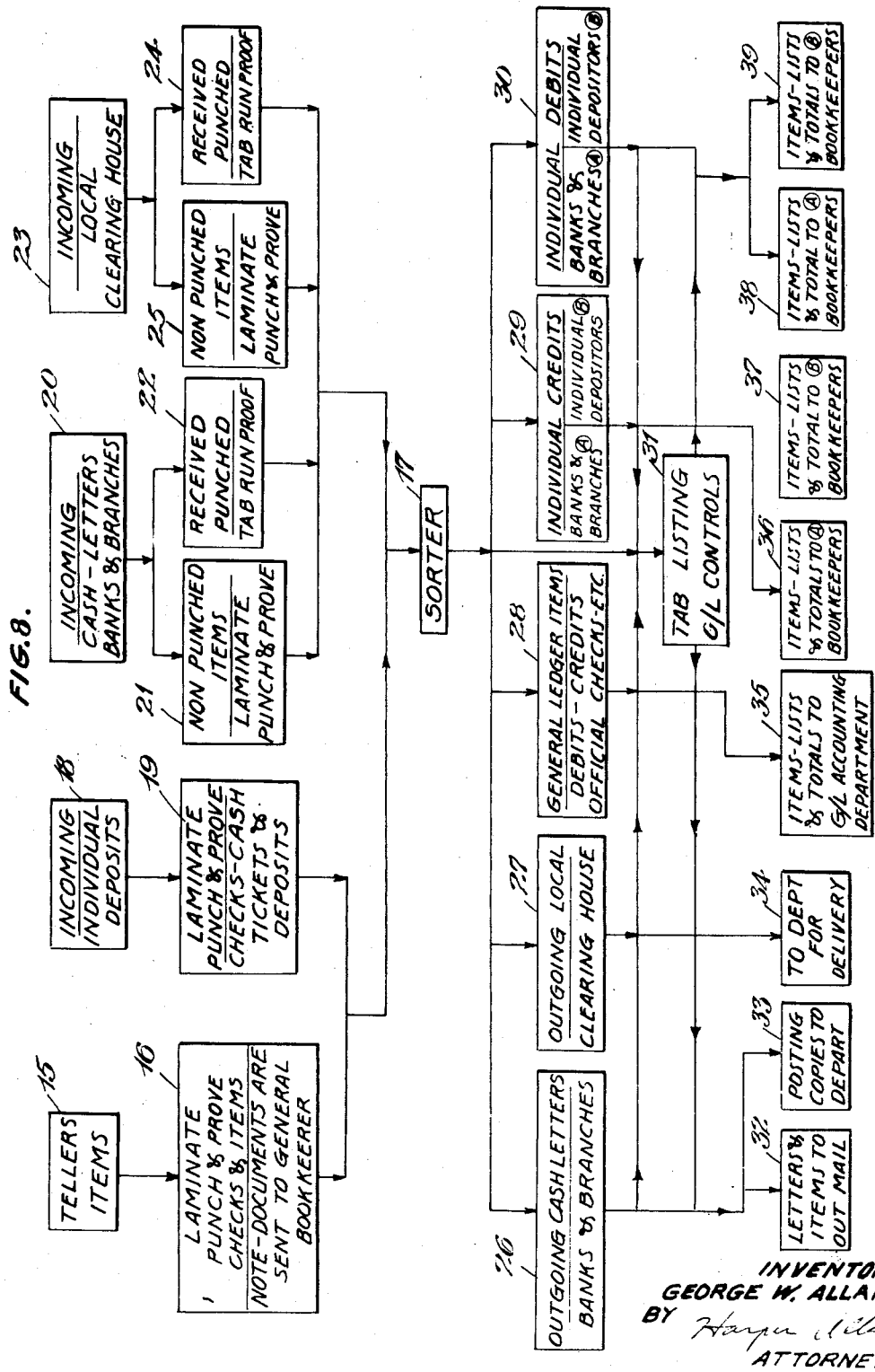
Figure 8 is a diagram illustrating the flow of work in accordance with the instant invention through a bank.

Many attempts have been made to simplify commercial accounting operations and adapt them to the use of automatic equipment to simplify, hasten, and lessen the cost of the accounting operation. Such systems in many cases employ the well-known punched card of the Hollerith or Powers types and many institutions issue their checks on cards of this character so that when the checks are issued and returned they can be handled by automatic methods. However, these items when being handled in commercial banking and clearing house institutions must be handled in the same fashion as other accounting items, such as checks and deposit slips of the more common written character, and no attempt has been made to provide a common coded article representative of an accounting item for handling through the commercial banking institutions. As a result, these institutions must handle a large mass of accounting items of all sorts and kinds and these must be handled repeatedly and proved repeatedly as they enter and leave various banking institutions, branches and departments in the course of their travel from the originator of the check or accounting item to the paying institution, branch or department.

In accordance with the instant invention, all of these items are made of a common character by attachment to a card, preferably as an integral part thereof, capable of coding to represent the various indicia found on the accounting items and to a common size and rigidity, by virtue of the attachment to the carrier or code card, so that automatic handling of these items becomes possible after they have once been affixed to the code card or carrier.

In accordance with this invention, the first institution to receive an accounting item or to originate an accounting item places the accounting item on a carrier or code card which can be perforated, printed, slotted or edge notched to provide indicia indicating the amount of the item, the identity of the receiving and of the paying banks and any other data which it may be desirable to record. Preferably, the check carrier or code card is in the form of a transparent, heat-sealing or laminating plastic such as vinyl resin commonly sold under the tradename of "Vinylite" which is affixed to the face of the accounting item as illustrated in Figures 1 and 2. It is also preferred to embed the check into the face of the card as illustrated more clearly in Figure 7 so that it becomes a unitary part of the code card. Alternatively, the transparent card may be supplied with a laminating coating or may be glued to the accounting item. Where the check or accounting item is embedded in the code card, the transparent plastic is preferably of such a thickness that the embedding of the check therein will not materially affect the dimensions thereof. This embedding is done with the code card in a pocket which conforms to the desired outline of the code card and maintains the card in the proper form while it is subjected to the heat and pressure required to embed the check therein. Where a plastic sheet is employed so that the total thickness of the plastic and the check would increase the thickness appreciably, as in Figure 6, then preferably a thinner plastic sheet is used for laminating checks of the largest size to their code card as compared with the thickness of the plastic shown in Figure 2 and 4 so that a substantially uniform thickness of the accounting item will result. With a transparent code card, all of the data appearing on the face can be read through the code card or carrier and this data is protected against any alteration, defacement or mutilation. This method of attachment also leaves the back of the accounting item, such as a check, free for endorsements and other markings thereon as commonly practiced at the present. It is preferred to attach the carrier in a common relation to each of the checks to facilitate their handling in automatic equipment now used in banks such as endorsing and perforating machines, and for this purpose the check 11 has been shown in Figures 1 and 2 as being in alignment or registry with the upper left-hand corner of the carrier 10. Figures 3 and 4 are similar to Figures 1 and 2 but illustrate with an intermediate size check 11a heat-sealed or adhered to the carrier 10. Figures 5 and 6 illustrate the carrier with a maximum size accounting item 11b attached thereto which corresponds exactly in size to the carrier or code card itself. Perforations 12 in Figure 3 are indicative of one method of coding the accounting item with indicia corresponding to certain of the indicia or data on the check.

In carrying out the process, the first step, as explained above, is the affixing or attachment of the accounting item to the carrier or code card for handling of the item and the carrier as a unit, and preferably this is carried out by affixing or laminating a transparent plastic card to the face of the accounting item, such as a check, with the check embedded therein, by heat sealing or with a transparent glue. This step may be carried out with conventional heat and pressure methods. Thereafter the carrier is marked with code indicia corresponding to the indicia of the item, for example, the amount of the item, the identity of the receiving and paying banks in the case of a check, as to the identity of the issuing party if so desired, or any other desired indicia. The marking may be carried out with conventional punching or perforating equipment, and preferably in punching the item a verifying type of equipment is used so that the indicia is entered in the machine in two places and compared. If the two sets of indicia are the same, the item is proved, i. e., the operator has correctly entered the indicia from the accounting item, and the punching operation is performed in accordance with the indicia set up. In some types of equipment the punching operation and the verifying operation are performed in sequence. It will be understood that certain indicia, for example the American Banking Association coding for the home bank can be permanently set in the punching machine so that no verifying operation is required.

In accordance with conventional practice, at the same time the punching operation is performed a listing is made of the item so that a group of items received will be proved as they are attached to the carrier and punched. Cash letters, deposit slips, tellers' credits and gain and loss items are handled likewise using a credit code designation.

In the event an error has been made in handling a group of items, it is only necessary ot make out an error correction debit or credit as the case may be on a card to be charged to the same account.

In Figure 8 there is shown a typical method or accounting operation employing the accounting article and system of the instant system. Box 15 represents items originated by the teller, which, being original items, must be laminated or attached to the code card or carrier, punched and proved as indicated in box 16, and then sent to the automatic sorter 17, which may be of the conventional punch card variety if this type of coding for the indicia on the accounting item is employed. Box 18 representing incoming individual deposits, likewise being original items, require the lamination or attachment to the carrer or code card, punching and proving, as indicated at 19, and then transmitted to the sorter 17.

Box 20 represents incoming cash letters and similar accounting items from other banks or branches and these may be divided into two types, depending upon whether or not the items have been previously attached to a code card or carrier. As shown in box 21, the non-punched items are laminated or attached to the carrier, and are punched and proved for transmission to the sorter. Those received already attached to a carrier which has been punched are subjected to a tabulating run for proof, as indicated at 22 before being sent to the sorter. Another group of incoming items, for example, from the local clearing house, is indicated at 23 and these items are also divided into two classes, those having been previously laminated or attached to a card carrier and punched as indicated at 24, and those which have not been run through this step so that they must be laminated to the carrier, punched and proved, as indicated at 25.

From the above description, it will be seen that after the initial receipt of the particular items and the processing thereof with the carrier or code card, they all go to the same automatic equipment, i. e., the sorter 17, where they can be automatically segregated into the various groups required for further processing through the bank. For example, outgoing cash letters to banks and branches are indicated at 26, outgoing local clearing house material at 27, general ledger items, etc. at 28, and correspondingly the individual credits and debits at 29 and 30.

Afterwards these various individual groups of items which have been segregated in the sorter 17 are sent as groups to the tabulator listing machine indicated at 31 where the totals of the various items for the gain and loss controls can be obtained and from which the various items are sent to the final accounting or handling operation. For example, cash letters and items to out-mail, as indicated at 32, posting copies of the same items to the appropriate departments of the institution as indicated at 33, the items of the local clearing house to the department for delivery as indicated at 34, the general ledger items, lists, etc. to the gain and loss accounting department as indicated at 35, the individual credits to banks and branches to the bookkeepers as indicated at 36, and the individual depositor credits to the appropriate bookkeeper as indicated at 37. The individual debits going to banks and branches and to individual depositors are similarly handled at 38 and 39.

It will be noted that the items at 32 and 34 are outgoing items to subsequent institutions and that these are all attached to a carrier and have the indicia coded into the carrier so that these items can be automatically handled in subsequent handling or paying banks.

It will be appreciated, of course, that with all banking institutions employing the instant system that operations indicated at 21 and 25, i. e., the receipt of non-punched items from other banking institutions would be eliminated.

This application is a continuation-in-part of my co-pending application, Serial No. 79,539, filed March 4, 1949.

While I have shown and described a preferred embodiment of the invention, it will be apparent that the invention is capable of further variation and modification and its scope should be limited only by the scope of the claims appended hereto.

I claim:

1. An accounting article comprising an accounting item having indicia thereon as to both identity and amount and a transparent rectangular code card permanently secured to the face of the accounting item in overlapping relation therewith and having code indicia corresponding to at least certain of the amount and identity of indicia of the accounting item, said accounting item being embedded in the code card to form a unitary article therewith of uniform thickness leaving the back of the accounting item exposed and lying substantially in the plane of one face of the card, said code card having respective faces always facing oppositely, and said card defining the outer edges of said article.

2. An accounting article comprising an accounting item having indicia thereon as to both identity and amount and a transparent rectangular plastic code card heat-sealed to the face of the accounting item in overlapping relation therewith and having code perforations corresponding to at least certain of the amount and identity indicia of the accounting item, said accounting item being embedded in the code card to form a unitary article therewith of uniform thickness leaving the back of the accounting item exposed and lying substantially in the plane of one face of the card, said code card having respective faces always facing oppositely, and said card defining the outer edges of said article.

3. An accounting method for handling successive accounting items of varying size which comprises providing a plurality of rectangular transparent code cards of uniform size and having respective front and rear faces always facing oppositely and in the same direction relative to said card, the card being of at least the size of the largest accounting item to be handled, simultaneously affixing the transparent card permanently to the face of an accounting item bearing written or printed indicia and embedding the item in the card to maintain a uniform size of the card by placing the back of the item in exposed condition and lying substantially in the place of one face of the card, marking the card with code indicia corresponding to at least certain of the indicia on the face of the item, to provide a composite accounting article wherein the size of the accounting article is uniform irrespective of the original size of the accounting item to be handled, and whereby the written or printed indicia on the face of the accounting item can be read through the face of the transparent card, and whereby the accounting article in its finished form is adaptable to automatic accounting machine operation.

4. An accounting method for handling successive accounting items of varying size which comprises providing a plurality of rectangular transparent imperforate plastic code cards of uniform size and having respective front and rear faces always facing oppositely and in the same direction relative to said card, the card being of at least the size of the largest accounting item to be handled, simultaneously heat-sealing the transparent card permanently to the face of an accounting item bearing written or printed indicia and embedding the item in the card to maintain a uniform size of the card by placing the back of the item in exposed condition and lying substantially in the plane of one face of the card, perforating the card with code indicia corresponding to at least certain of the indicia on the face of the item, to provide a composite accounting article wherein the size of the accounting article is uniform irrespective of the original size of the accounting item to be handled, and whereby the written or printed indicia on the face of the accounting item can be read through the face of the transparent card, and whereby the accounting article in its finished form is adaptable to automatic accounting machine operation.

References Cited in the file of this patent

UNITED STATES PATENTS

| Number | Name | Date |
|---|---|---|
| 2,185,356 | Robertson | Jan. 2, 1940 |
| 2,424,110 | Morrison | July 15, 1947 |
| 2,459,263 | Callanan | Jan. 18, 1949 |
| 2,512,106 | Langan | June 20, 1950 |
| 2,537,732 | Angus | Jan. 9, 1951 |